(12) United States Patent  (10) Patent No.: US 7,664,352 B1
Okayama  (45) Date of Patent: Feb. 16, 2010

(54) SPOT SIZE CONVERTER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/453,366

(22) Filed: May 8, 2009

(30) Foreign Application Priority Data

Aug. 29, 2008 (JP) .............................. 2008-221515

(51) Int. Cl.
G02B 6/26 (2006.01)
G02B 6/42 (2006.01)

(52) U.S. Cl. ............................. 385/43; 385/27; 385/28; 385/146; 385/49; 385/50

(58) Field of Classification Search .................. 385/14, 385/27, 28, 39, 43, 49, 50, 129–132, 146
See application file for complete search history.

(56) References Cited

U.S. PATENT DOCUMENTS 6,553,164 B1 * 4/2003 Ono et al. ..................... 385/45
6,684,011 B2   1/2004 Jeong et al.
6,701,033 B2 * 3/2004 Okayama ..................... 385/16
6,937,797 B2   8/2005 Mizuno et al.
7,099,540 B2   8/2006 Shimoda

FOREIGN PATENT DOCUMENTS

| JP | 07063935 | 3/1995 |
| JP | 09015435 | 1/1997 |
| JP | 2000-235128 | 8/2000 |
| JP | 2002-162528 | 6/2002 |
| JP | 2003-207684 | 7/2003 |
| JP | 2005-326876 | 11/2005 |

* cited by examiner

Primary Examiner—Frank G Font
Assistant Examiner—Mary A El Shammaa
(74) Attorney, Agent, or Firm—Rabin & Berdo, P.C.

(57) ABSTRACT

A spot size converter has a first core, a larger second core, and a clad disposed on a substrate. The first core has a rectilinear cross-sectional shape and is embedded in the clad, except at its ends. One of these ends has a sloping surface along which the thickness of the first core tapers gradually to zero. The second core, which has a refractive index intermediate between the refractive indexes of the first core and clad, sits on the clad and covers the sloping end surface of the first core. Light propagates through the first core, then through the second core into an external optical device, or propagates from an external optical device through the second core into the first core. This arrangement provides a spot size converter having an easily manufacturable structure and no polarization dependency.

11 Claims, 9 Drawing Sheets

US 7,664,352 B1

SPOT SIZE CONVERTER

BACKGROUND OF THE INVENTION

1. Field of the Invention

The present invention relates to a spot size converter used as an optical link between a silicon-wire waveguide and an external optical device such as an optical fiber or laser diode.

2. Description of the Related Art

Silicon-based waveguide technology has been attracting attention recently. A silicon-wire waveguide, in which a silicon (Si) core is surrounded by a silicon dioxide ($SiO_2$) clad having a much smaller refractive index, is one type of silicon-based waveguide. Because of the large difference between the refractive indexes of the core and clad, light is strongly confined in the core. This tight confinement enables a silicon-wire waveguide to turn corners with a radius of curvature as small as about one micrometer (1 µm). Silicon-wire waveguides can accordingly be used to create optical devices with submicron-order dimensions, which can be integrated with electronic devices on the same silicon chip.

Because the core diameter of a silicon-wire waveguide is much smaller than the core diameter of most optical fibers, optically coupling a silicon-wire waveguide to an optical fiber generally requires a spot size converter. The same is true of optical couplings between silicon-wire waveguides and other external optical devices such as laser diodes.

Many types of spot size converters have been proposed. Japanese Patent Application Publications (JP) H07-063935, 2000-235128, 2002-162528 (U.S. Pat. No. 6,937,797 to Mizuno et al.), and 2003-207684 (U.S. Pat. No. 7,099,540 to Shimoda) disclose optical waveguides with tapered widths, while JP 09-015435 and JP 2005-326876 disclose optical waveguides with tapered thicknesses. U.S. Pat. No. 6,684,011 to Jeong et al. discloses a spot size converter having a vertical double-layer structure in which the upper core layer is tapered in the width direction.

One problem with these known spot size converters is their large polarization dependency. Another problem is that many of them are extremely difficult to manufacture.

SUMMARY OF THE INVENTION

An object of the present invention is to provide a spot size converter having an easily manufacturable structure and no polarization dependency.

Another object of the invention is to provide a method of manufacturing such a spot size converter.

The invention provides a novel spot size converter having a first core and a second core. The first core is straight and has a sloping surface which is covered by the second core. The first core has a higher refractive index than the second core. This core geometry can provide a polarization-independent spot size conversion effect.

The first core is encased in a clad, which has a refractive index lower than the refractive index of the second core and at least forty percent lower than the refractive index of the first core. The sloping surface is formed by anisotropic etching of the first core and clad, after which the second core is formed so as to surround an optical input-output region including the sloping surface. The novel spot size converter is accordingly easier to manufacture than are conventional spot size converters.

The cores and clad are fabricated on a major surface of a substrate. The main core region of the first core has a rectilinear solid shape with four sides and an end. The first and second sides are mutually parallel and are orthogonal to the third side, which is parallel to the fourth side. The optical input-output region of the first core extends from the end of the main core region. The sloping surface in the optical input-output region slopes linearly from the second side of the main core region to an extension of the first side of the main core region, and is orthogonal to the third and fourth sides.

The first and second sides of the first core may be parallel to the major surface of the substrate. The sloping surface may then be formed by use of an etching mask with a thickness that varies linearly from a predetermined thickness to zero in an area above at least the input-output region of the first core.

Alternatively, the first and second sides of the first core may be orthogonal to the major surface of the substrate. The sloping surface may then be formed by use of an etching mask with an edge that cuts diagonally across an area above at least the input-output region of the first core.

The first and second cores may be made of silicon, and the clad of silicon dioxide.

DETAILED DESCRIPTION OF THE INVENTION

Figure 1:
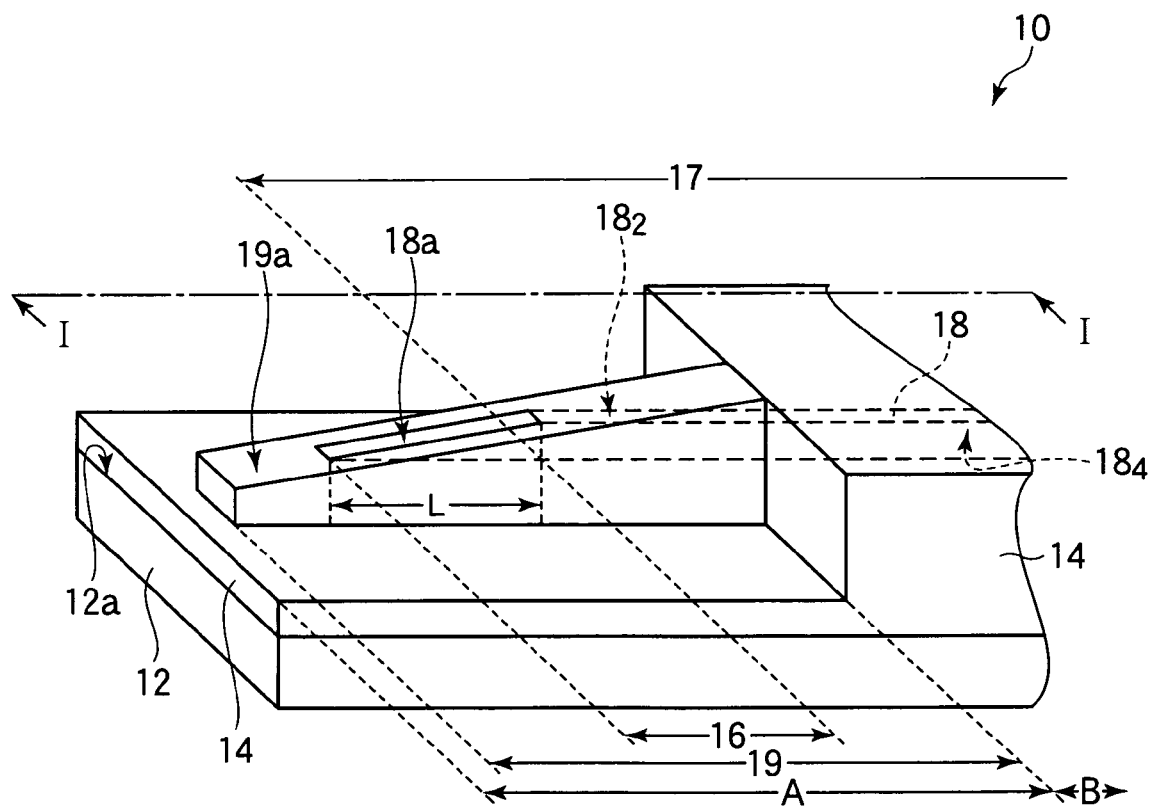
FIG. 1 is a schematic perspective view illustrating the substrate, clad, and first core of a spot size converter in a first embodiment of the invention.

Embodiments of the invention will now be described with reference to the attached non-limiting drawings, in which like elements are indicated by like reference characters.

First Embodiment

Referring to FIG. 1, the spot size converter 10 in the first embodiment includes a substrate 12, a clad 14, and a first core 18 having an optical input-output region 16 and a main core region 17.

The substrate 12 is preferably a flat rectangular solid body of, for example, monocrystalline silicon with parallel major surfaces.

The clad 14 is formed on the entire upper major surface 12a of the substrate 12. The material of the clad 14 is preferably silicon dioxide ($SiO_2$). The first core 18 extends straight through the clad 14, paralleling the upper major surface 12a of the substrate 12.

Light propagates in the direction in which the first core 18 extends, which will be referred to as the length direction. The direction parallel to the upper major surface 12a of the substrate 12 and orthogonal to the length direction will be referred to as the width direction. The direction orthogonal to the upper major surface 12a of the substrate 12 will be referred to as the thickness direction.

The clad 14 and the first core 18 will now be described in detail.

In terms of the structure, the spot size converter 10 in the first embodiment is divided into the regions A and B indicated in FIG. 1.

Region A is the region in which light is coupled into or out of the spot size converter 10, and is accordingly the functional end of the spot size converter 10. The function performed is to convert the spot size of the light so that an efficient coupling can be made with an external optical device such as an optical fiber or laser diode. Region A includes the optical input-output region 16 of the first core 18, part of the main core region 17 adjacent to the optical input-output region 16, and the most of the second core 20 shown in FIG. 2.

Region B is the base of the spot size converter 10. Its function is to propagate light with a relatively small spot size. Region B has the well-known form of a silicon-wire optical waveguide in which the main core region 17 of the first core 18 is embedded in the clad 14. The light enters or leaves the first core 18 at the far end of the main core region 17, which is not shown.

The clad 14 differs in structure between region A, which includes the optical input-output region 16 of the first core 18 and the front part of the main core region 17, and region B, which includes the back part of the main core region 17.

In region B, the clad 14 has a uniform thickness.

In the part of region A surrounding the front part of the first core 18, including the optical input-output part, the clad 14 forms a projecting ramp 19 having a sloping top surface and a rectangular cross-section. In the other parts of region A, the clad 14 has a uniform thickness thinner than the thickness of the clad 14 in region B.

The projecting ramp 19 of the clad 14 surrounds both the optical input-output region 16 of the first core 18 and the front part of the main core region 17, and has a thickness that increases linearly in the length direction from a point in front of the optical input-output region 16 toward region B. Throughout its length, the projecting ramp 19 is higher than the flat surface of the clad 14 in the rest of region A.

In the width direction, the projecting ramp 19 of the clad 14 has a fixed width wider than the width of the first core 18. The first core 18 is centered in the projecting ramp 19 in the width direction.

Figure 3:
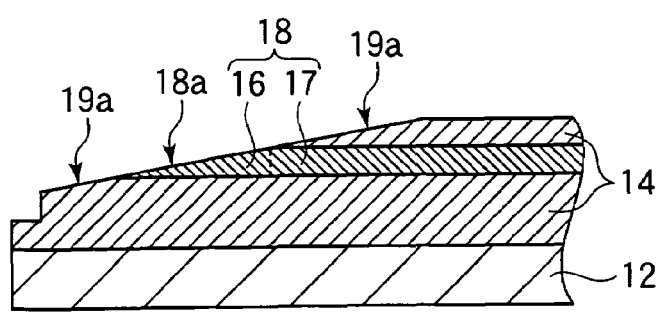
FIG. 3 is a longitudinal cross sectional view along line I-I in FIG. 1.

At its highest point, where it joins region B, the projecting ramp 19 meets the top surface of the clad 14 in region B. The projecting ramp 19 of the clad 14 accordingly surrounds the first core 18 in the thickness direction as well as the width direction, but as the height of the projecting ramp 19 slopes down from the edge of the top surface of the clad 14 in region B, its sloping upper surface 19a cuts across the first core 18, exposing a sloping surface 18a of the first core 18 in the optical input-output region 16, as shown in FIGS. 1 and 3. The sloping upper surface 19a of the projecting ramp 19 includes the sloping surface 18a of the optical input-output region 16 of the first core 18. Part of this sloping surface 19a is a sloping surface of the clad 14, which surrounds and is coplanar with the sloping surface 18a of the input-output region 16 of the first core 18.

Figure 4:
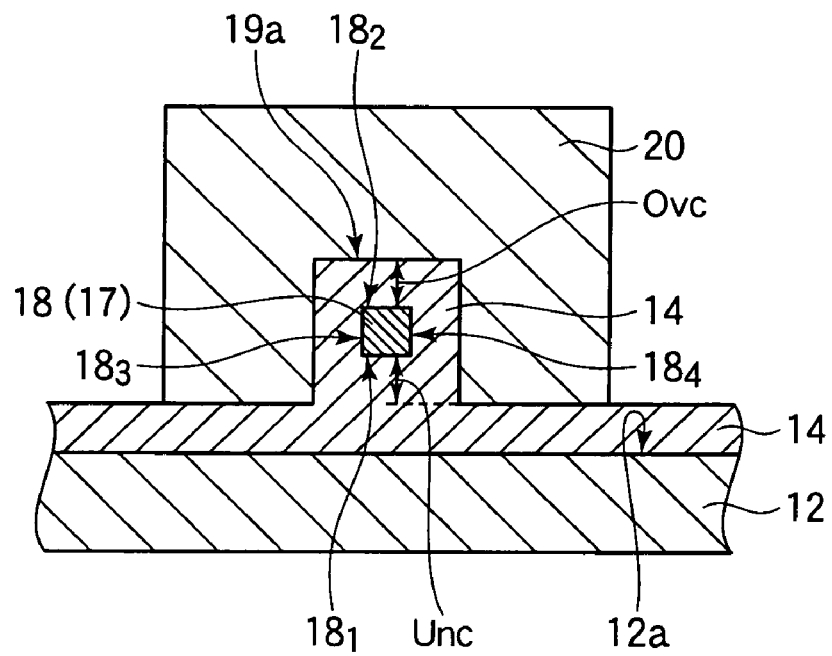
FIG. 4 is a lateral cross sectional view along line C-C in FIG. 2.

The first core 18 extends linearly. The optical input-output region 16 of the first core 18 has a right-triangular wedge shape with a fixed width and a thickness that decreases linearly to zero, as shown in FIG. 3. That is, the optical input-output region 16 of the first core 18 is a right-triangular prism, while the main core region 17 of the first core 18 is a rectangular solid. The optical input-output region 16 extends from one end of the main core region 17. The main core region 17 has four longitudinal sides orthogonal to this end. Referring to FIG. 4, the first side $18_1$ is parallel to the upper major surface 12a of the substrate 12, the second side $18_2$ is parallel to the first side $18_1$, the third side $18_3$ is orthogonal to the first and second sides $18_1$, $18_2$, and a fourth side $18_4$ is parallel to the third side $18_3$.

The sloping surface 18a of the optical input-output region 16 of the first core 18 is orthogonal to the third and fourth sides $18_3$, $18_4$ and extends from the second side $18_2$ to the first side $18_1$. To prevent light propagating through the first core 18 from escaping to the substrate 12, the thickness Unc of the clad 14 between the first core 18 and the flat surface of the clad 14 disposed on the upper major surface 12a of the substrate 12 is preferably at least, for example, about 1 μm.

The alignment of the four sides $18_1$, $18_2$, $18_3$, $18_4$, of the first core 18 will now be described in more detail.

Of the first and second sides $18_1$, $18_2$, which are both parallel to the upper major surface 12a of the substrate 12, the first side $18_1$ is disposed closer to the upper major surface 12a in the thickness direction, as best seen in FIG. 4. The first side $18_1$ is thus disposed between the second side $18_2$ and the upper major surface 12a of the substrate 12.

Of the third and fourth sides $18_3$, $18_4$, which are orthogonal to the upper major surface 12a of the substrate 12, the third side $18_3$ is located toward the back in FIG. 1 and the fourth side $18_4$ is located toward the front in FIG. 1.

Figure 2:
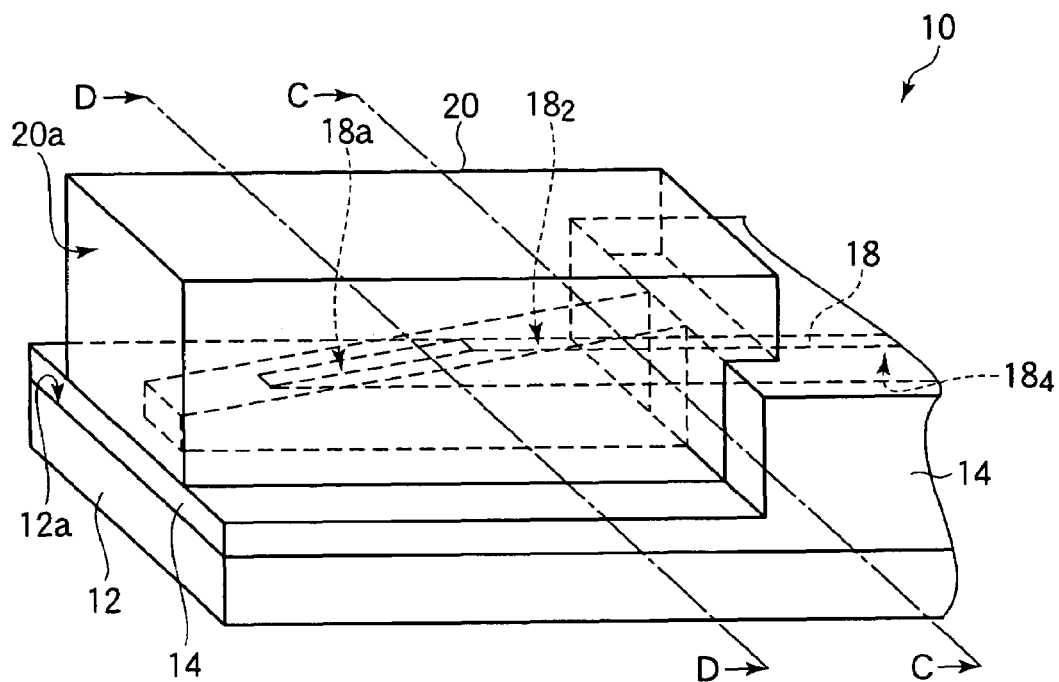
FIG. 2 is a schematic perspective view illustrating the complete structure of the spot size converter in FIG. 1, including the second core.

Referring to FIG. 2, the second core 20 is seated on the clad 14, covering the sloping surface 18a of the optical input-output region 16. The second core 20 is made from a material, preferably a polyimide plastic, having a refractive index intermediate between the refractive indexes of the first core 18 and clad 14.

The greater part of the second core 20 is a rectangular solid body covering the optical input-output region 16 and the clad 14 surrounding the optical input-output region 16 in region A. The optical input-output region 16 is centered in the second core 20 in the width direction.

The second core 20 has an optical input-output facet 20a through which light is coupled into or out of the spot size converter 10 to form an optical interface with an external optical device. The optical input-output facet 20a extends in the thickness and width directions, facing the optical input-output region 16 of the first core 18, and is parallel to the end of the main core region 17 that joins the optical input-output region 16.

Since the second core 20 covers the optical input-output region 16 and the clad 14 surrounding the optical input-output region 16 in region A, the end of the second core 20 opposite the optical input-output facet 20a may be located at the joint between regions A and B. Manufacturing process considerations, however, may require the second core 20 to extend into region B, as shown.

Next, the relations among the refractive indexes of the first core 18, the clad 14, and the second core 20 will be described in more detail, using n1 to represent the refractive index of the first core 18, n2 to represent the refractive index of the clad 14, and n3 to represent the refractive index of the second core 20. The refractive indexes n1, n2, n3 simultaneously satisfy the following conditions (1) and (2).

$$n1 > 1.4 \times n2 \quad (1)$$

$$n1 > n3 > n2 \quad (2)$$

The refractive index n1 of the first core 18 is at least forty percent greater than the refractive index n2 of the clad 14, and is also greater than the refractive index n3 of the second core 20, which is greater than the refractive index n2 of the clad 14.

Next, referring to FIGS. 1 to 5, the operation of the spot size converter 10 will be described for an exemplary case in which light is coupled out of the spot size converter 10 to form an optical coupling to an external optical device such as an optical fiber (not shown). The case in which light is coupled into the spot size converter 10 from an external optical device is essentially the same, except for the direction of propagation of the light.

The light to be coupled from the spot size converter 10 into the external optical device propagates through the first core 18 from region B into region A. As the thickness of the first core 18 gradually decreases to zero at the front of the optical input-output region 16 in region A, the difference (n1−n3) of the equivalent refractive indexes of the first core 18 and the second core 20 decreases to zero.

The ability of the first core 18 to confine light accordingly decreases toward the front of the optical input-output region 16. As a result, the spot size of the light propagating toward the front of the optical input-output region 16 gradually increases, in inverse proportion to the decrease of the light confinement ability of the first core 18. For example, the spot size is larger at the location of the cross section in FIG. 5 than at the location of the cross section in FIG. 4.

At the front end of the optical input-output region 16, since the thickness of the first core 18 is zero, in theory the spot size of the light becomes infinite, which of course does not match the spot size of the external optical device.

The second core 20 overcomes this problem. Since the refractive index of the second core 20 is intermediate between the refractive indexes of the first core 18 and the clad 14, the light is confined in the second core 20 and the expansion of the optical spot size is checked.

The spot size of the light entering or leaving the optical spot size converter 10 is limited by the size of the optical input-output facet 20a of the second core 20. If the dimensions of the optical input-output facet 20a of the second core 20 are similar to the dimensions of the optical input-output surface of the external optical device with which a coupling is to be made, the spot size is converted to a size that makes an efficient coupling with the external optical device.

Figure 5:
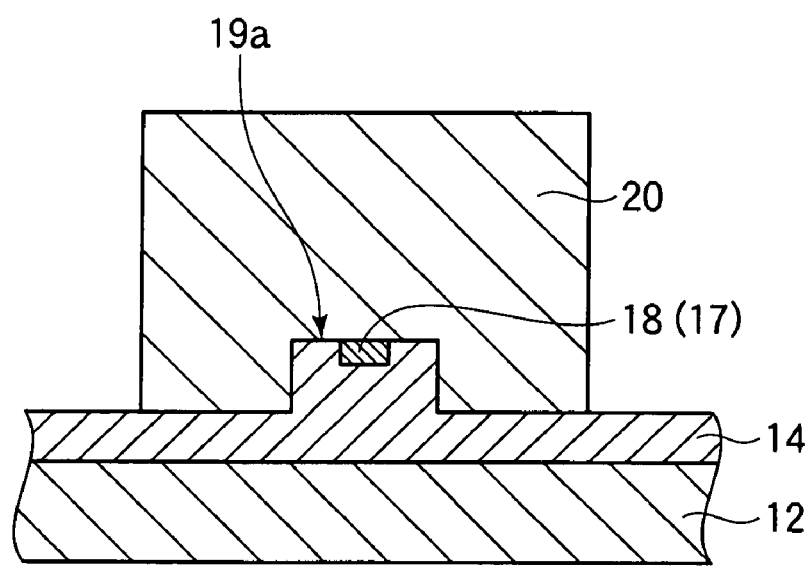
FIG. 5 is a lateral cross sectional view along line D-D in FIG. 2.

Next a simulation of the operation of the spot size converter 10 will be described, mainly referring to FIGS. 4 and 5 and the graph in FIG. 6, which illustrates the results of the simulation.

Figure 6:
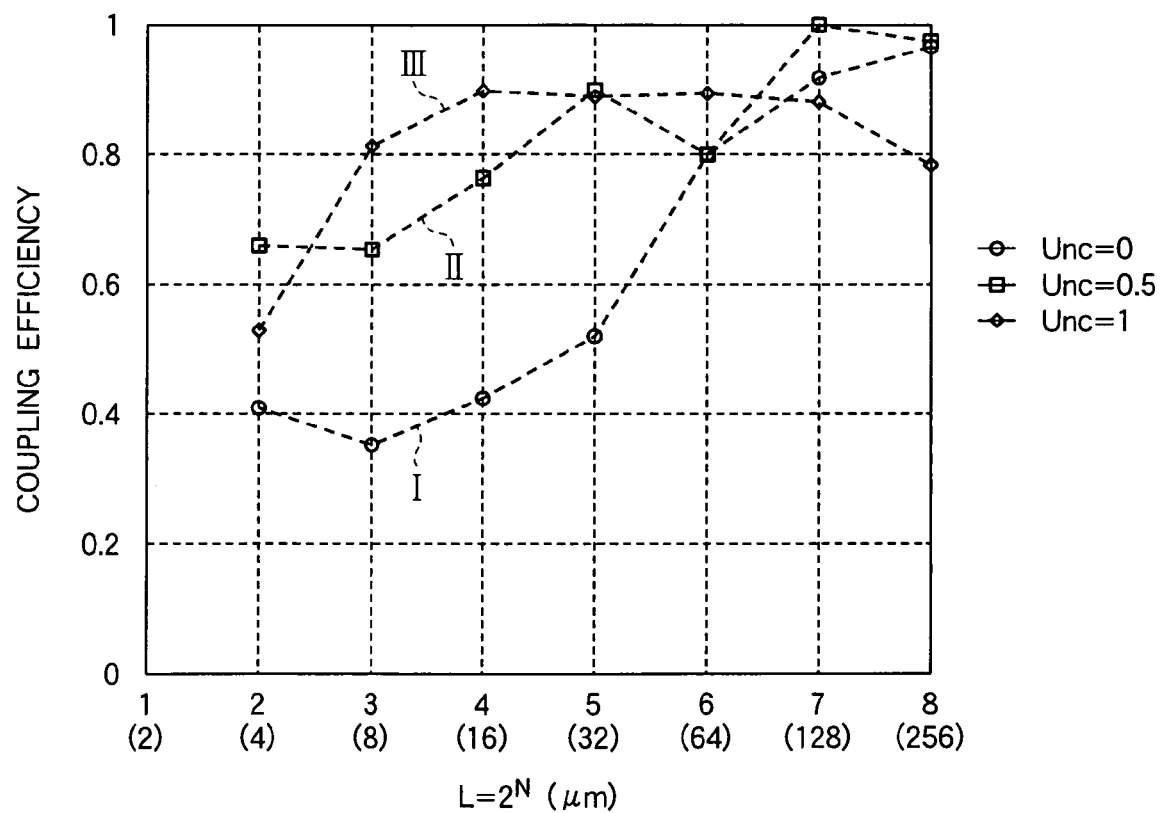
FIG. 6 is a graph showing results of a simulation of the operation of the spot size converter in the first embodiment.

In FIG. 6, the vertical axis indicates the coupling efficiency of light (a non-dimensional quantity). On the horizontal axis, the numbers in parentheses indicate the length L of the optical input-output region 16 in micrometers (μm), and the numbers above the parentheses indicate L as a power of two (L=$2^N$). For example, a value of one (N=1) means that the length L is 2 μm (L=$2^1$=2), and a value of three (N=3) means that the length L is 8 μm (L=$2^3$=8).

In the simulation, the coupling efficiency of light was calculated by the semi-vector beam propagation method (SVBPM). A fixed intensity was assigned to the light assumed to enter the spot size converter 10 from an external optical device, the dimension Unc in FIG. 4 was varied as described below, and the intensity of the light in the first core 18 in region B and the coupling efficiency were calculated for each case.

The simulation was performed under the following conditions.

(1) The assumed wavelength of the light was 1.55 μm.

(2) The first core 18 was assumed to have a square cross-section. The assumed cross-sectional dimensions of the first core 18 in region B were 0.3 μm high (thick) by 0.3 μm wide.

(3) The assumed thickness Ovc (FIG. 4) of the clad 14 on the second side $18_2$ of the first core 18 was 0.5 μm.

(4) The first core 18 was assumed to be made from monocrystalline silicon with a refractive index n1 of 3.5. The clad 14 was assumed to be made from $SiO_2$ with a refractive index n2 of 1.46. The second core 20 was assumed to be made from polyimide with a refractive index n3 of 1.6.

(5) The combined width of the first core 18 and the clad 14 in the optical input-output region 16 was assumed to be 1.5 μm. That is, the width of the clad 14 on each side of the first core 18 in the optical input-output region 16 was assumed to be 0.6 μm.

(6) The assumed cross-sectional dimensions of the second core 20 were 2 μm high (thick) by 2 μm wide.

The three curves I, II, III in FIG. 6 indicate the results of the simulation for three different thicknesses Unc of the clad 14 between the first side $18_1$ of the first core 18 and the flat surface of the clad 14 disposed on the upper major surface 12a of the substrate 12: curve I is for a thickness Unc of 0 μm; curve II is for a thickness Unc of 0.5 μm; curve III is for a thickness Unc of 1 μm.

A general tendency in FIG. 6 is for the coupling efficiency to increase as the thickness Unc approaches 1 μm (curve III), that is, as the first core 18 approaches the center of the second core 20 in the thickness direction, more precisely, as an orthogonal projection of the first core 18 onto the input-output facet 20a of the second core 20 becomes substantially centered within the input-output facet 20a of the second core 20. This tendency is observed even if the length L of the optical input-output region 16 is comparatively short. The maximum coupling efficiency on curve III (Unc=1 μm) is about 90 percent, which is adequate for practical applications. This maximum value is attained when N is four (N=4) and the length L of the optical input-output region 16 of 16 μm, which is short enough for practical applications.

Although polarization dependency is not shown in the simulation, the spot size converter 10 in the first embodiment has much less polarization dependency than conventional spot size converters, for the following reason.

As the thickness of the first core 18 decreases in the input-output region 16, its equivalent refractive index with respect to the transverse electric (TE) wave propagating through the first core 18 becomes greater than the equivalent refractive index with respect to the transverse magnetic (TM) wave. The equivalent refractive index with respect to the TE wave does not match the comparatively lower equivalent refractive index felt by the light propagating through the second core 20 until the first core 18 becomes extremely thin. As a result, the TE wave shifts into the second core 20 at the front end of the tapered optical input-output region 16. If the optical input-output region 16 has a truncated taper shape lacking this front end, as in some conventional spot size converters, the TE wave does not shift adequately from the first core 18 into the second core 20. In the spot size converter 10 in the first embodiment, the front end of the optical input-output region 16 becomes thin enough for the both the TE and TM waves to shift efficiently into the second core. Light is accordingly coupled efficiently regardless of its polarization.

Next, referring to FIGS. 7 to 14, a method of manufacturing the spot size converter 10 will be described.

Figure 7:
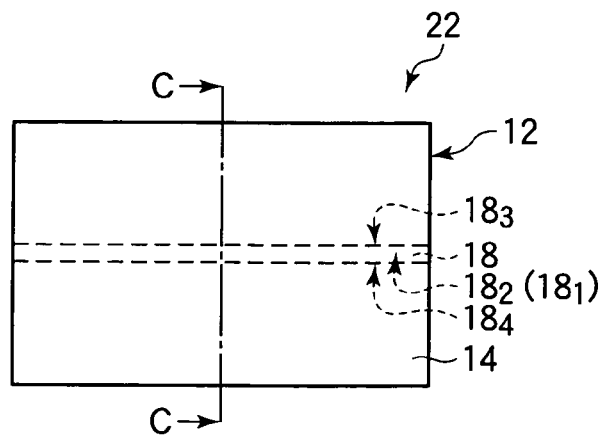
FIG. 7 is a plan view illustrating a preparatory step in a manufacturing process for the spot size converter.
Figure 8:
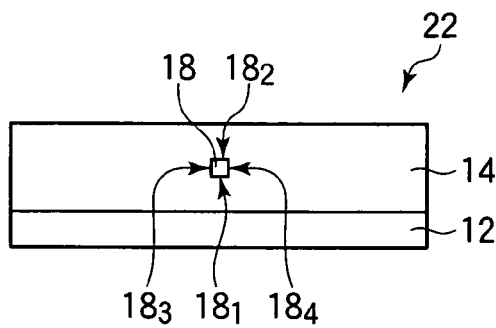
FIG. 8 is a cross-sectional view along line C-C in FIG. 7.

(1) Preparatory Step (FIGS. 7 and 8)

First, a preform 22 is prepared. The preform 22 includes a precursor of the first core 18, referred to below as a precursor core 18, embedded in a precursor clad 14 on the upper major surface 12*a* of a substrate 12.

A known type of silicon-on-insulator (SOI) substrate, having an $SiO_2$ layer interposed between upper and lower monocrystalline-silicon layers, is used to form the preform 22. An etching mask defining the precursor core 18 is formed on the surface of the upper monocrystalline-silicon layer, and this layer is etched by a known dry-etching method until only the masked part remains. The remaining part of the upper monocrystalline-silicon layer becomes the precursor core 18. Alternatively, an oxidation-resistant mask is used and the upper layer is oxidized by a known method, the part left unoxidized becoming the precursor core 18.

In either case, the mask is removed and an $SiO_2$ film is deposited on the entire surface of the resulting structure by chemical vapor deposition (CVD). The surface of the $SiO_2$ film is then planarized to form the preform 22 shown in FIGS. 7 and 8.

Figure 9:
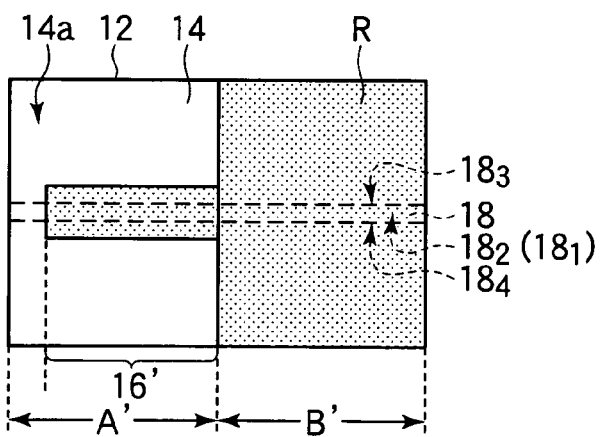
FIG. 9 is a plan view illustrating a first step in the manufacturing process in the first embodiment.
Figure 10:
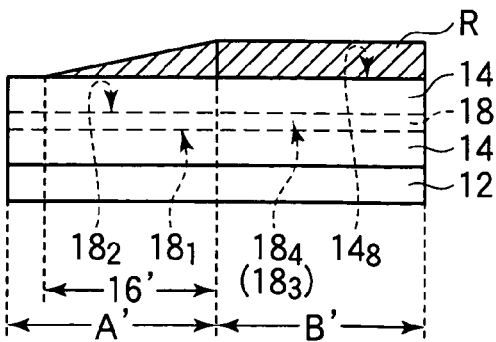
FIG. 10 is a side view illustrating the first step in the first embodiment.

(2) First Step (FIGS. 9 and 10)

An etching mask is formed on the upper surface 14*a* of the precursor clad 14. The etching mask has a thickness that varies linearly from a prescribed thickness to zero in the length direction in a region 16' covering at least the intended optical input-output region 16 of the first core 18.

To form the etching mask, photoresist is applied with a uniform thickness to the entire upper surface 14*a* of the preform 22. The photoresist is exposed to light through a grayscale mask and then developed. The grayscale mask transmits different amounts of light in three regions. After development, the remaining photoresist R has different thicknesses in the three regions, as described below.

(i) In a region B' corresponding to region B, the remaining photoresist R has a uniform thickness. This is the maximum thickness that remains after development.

(ii) In a region A' corresponding to the part of region A exterior to region 16', the remaining photoresist R has a thickness of zero (no photoresist remains).

(iii) In region 16', covering at least the optical input-output region 16 in region A, the grayscale mask causes the thickness of the remaining photoresist R to decrease linearly in the length direction from its maximum thickness in region B' to zero in region A'.

The remaining photoresist R becomes an etching mask having a fixed thickness in region B' and a thickness that varies linearly in the optical input-output region 16', as shown in FIGS. 9 and 10.

An ultraviolet-curing type of acrylic, epoxy, or polyimide may be used as the photoresist R.

The grayscale mask may be a glass plate or other plate having a variable transmittance at the wavelength of light (for example, ultraviolet light) used in the exposure process. The transmittance is 100% in region B' and 0% in region A', and varies linearly in region 16'. More information on grayscale masks can be found in, for example, JP 2004-303325.

Figure 11:
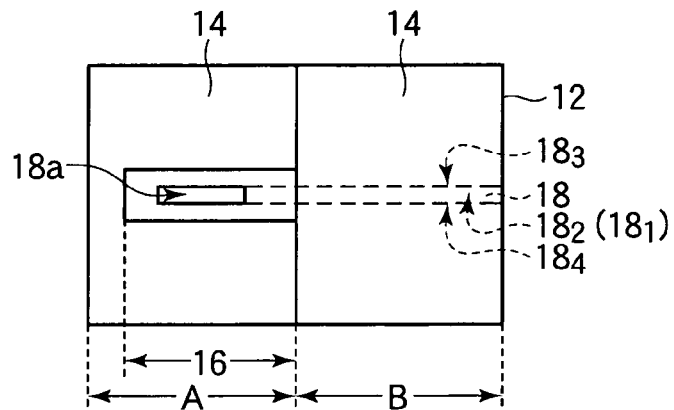
FIG. 11 is a plan view illustrating a second step in the manufacturing process in the first embodiment.
Figure 12:
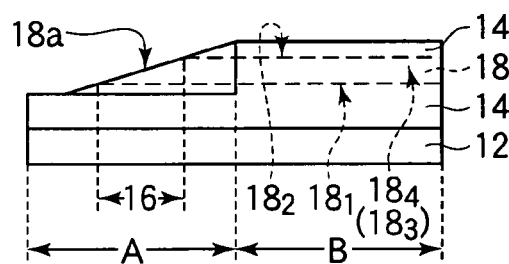
FIG. 12 is a side illustrating the second step in the first embodiment.

(3) Second Step (FIGS. 11 and 12)

The preform 22 and the etching mask made from the photoresist R are etched by a predetermined amount by anisotropic reactive ion etching (RIE). The etching mask causes the etching depth to vary linearly in the precursor clad 14 from a depth below the first side $18_1$ of the first core 18 to a depth above the second side $18_2$ of the first core 18 in region 16', thereby giving the clad 14 and first core 18 their final configuration and forming the sloping surface 18*a* of the first core 18 in the optical input-output region 16. After the anisotropic etching, the remaining mask is removed by a known method.

Figure 13:
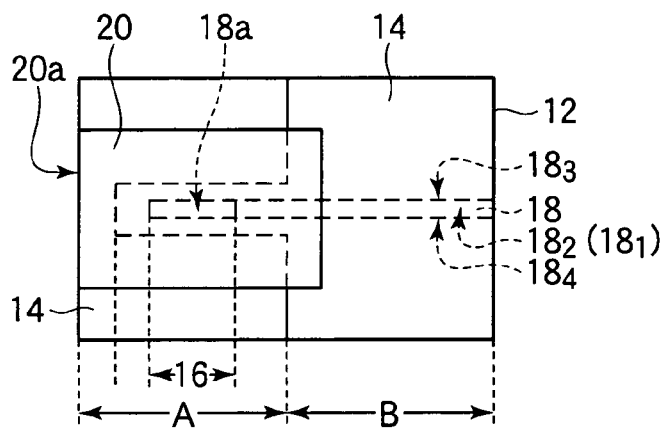
FIG. 13 is a plan view illustrating a third step in the manufacturing process in the first embodiment.
Figure 14:
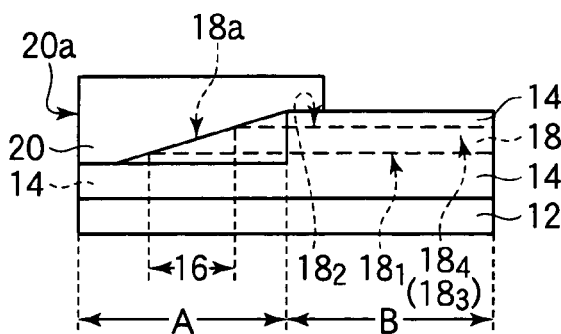
FIG. 14 is a side view illustrating the third step in the first embodiment.

(4) Third Step (FIGS. 13 and 14)

The second core 20 is now formed on the clad 14 and patterned by photolithography so as to cover the sloping surface 18*a* of the first core 18 and part or all of the surrounding sloping surface of the clad 14.

Specifically, the clad 14, including the sloping surface 18*a* of the first core 18, is coated with a layer of ultraviolet-curing resin having the prescribed refractive index n3 and the desired thickness. The ultraviolet-curing resin is exposed to ultraviolet light through a mask defining the desired width and length dimensions of the second core 20. The exposed part of the ultraviolet-curing resin is thereby cured. The uncured part of the ultraviolet-curing resin is removed by a known method, leaving the second core 20.

The preparatory step and the three subsequent steps described above complete the formation of the spot size converter 10.

The effects of the spot size converter 10 and manufacturing method in the first embodiment can be summarized as follows.

(1) Because the front end of the optical input-output region 16 has a thickness that tapers to zero, for the reasons described above, the spot size converter 10 has substantially no polarization dependency.

(2) When the spot size converter 10 in the first embodiment forms an optical coupling with an external optical device, as is clear from the results of the simulation described above, the length L of the optical input-output region 16 can be short enough for practical applications and the coupling efficiency can simultaneously be high enough for practical applications.

(3) The spot size converter 10 is extremely easy to manufacture, because all steps in the manufacturing process can be carried out by known semiconductor fabrication methods.

Second Embodiment

Next, a spot size converter 30 according to a second embodiment of the invention will be described with reference to FIGS. 15 to 23.

Figure 15:
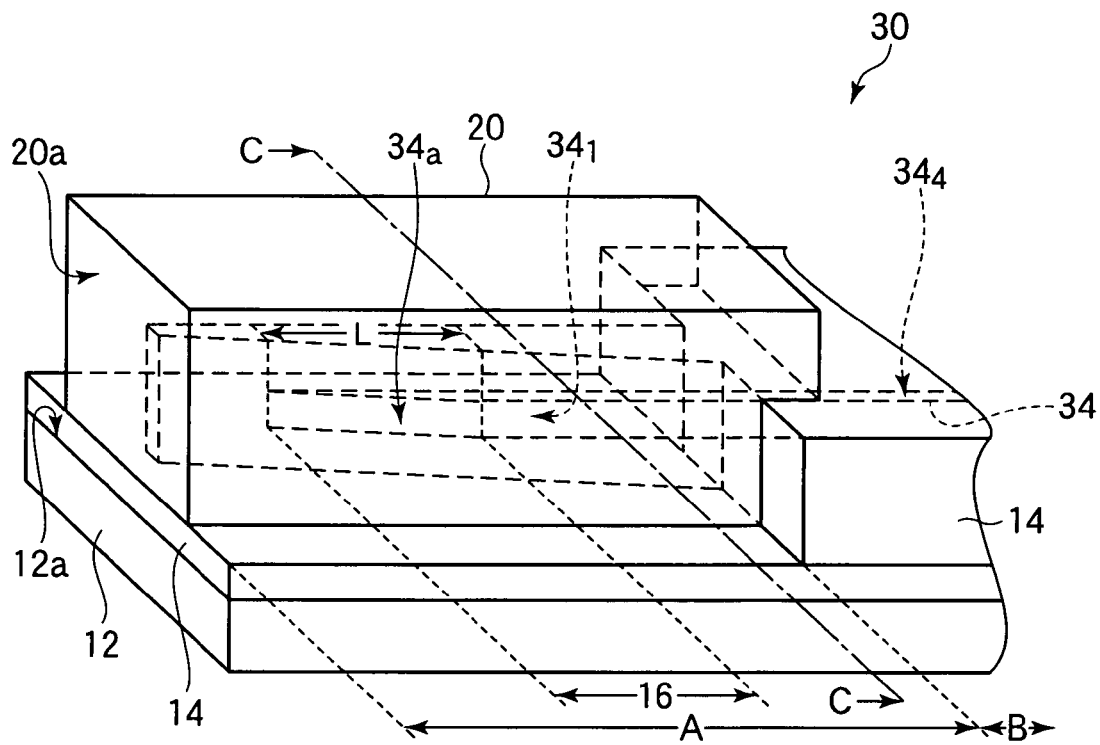
FIG. 15 is a schematic perspective view of the structure of a spot size converter in a second embodiment of the invention.

Referring to FIG. 15, the spot size converter 30 has the same structure as the spot size converter 10 in the first embodiment except that the projecting ramp surrounding the optical input-output region 16 is turned on its side. As a result, a line normal to the sloping surface 34*a* of the first core 34 lies in a plane parallel to the upper major surface 12a of the substrate 12, whereas in the first embodiment a line normal to the sloping surface 18a of the first core 18 was disposed in a plane orthogonal to the upper major surface 12a of the substrate 12, as can be appreciated from FIGS. 1 to 3.

Figure 16:
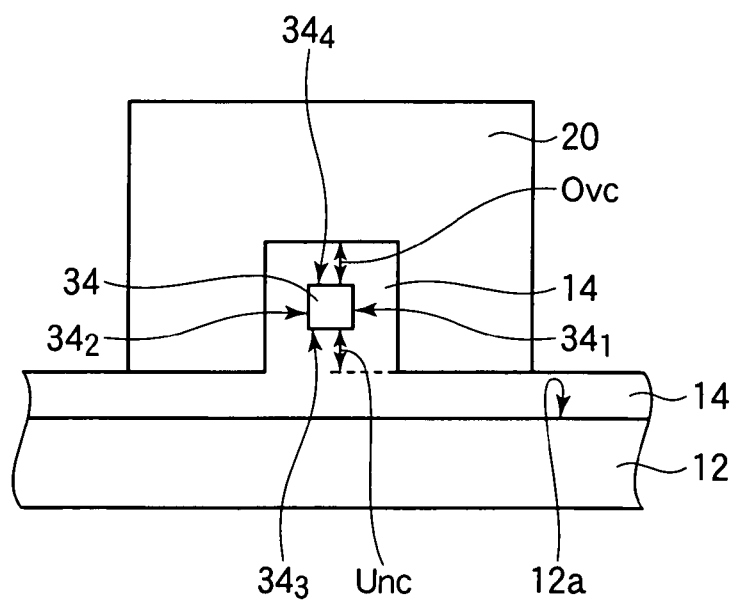
FIG. 16 is a cross-sectional view along line C-C in FIG. 15.

The alignment of the four sides $34_1$, $34_2$, $34_3$, $34_4$, of the first core 34 of the spot size converter 30, shown in FIG. 16, differs from the alignment of the four sides $18_1$, $18_2$, $18_3$, $18_4$, of the first core 18 of the spot size converter 10 shown in FIG. 4. The first and second sides $34_1$, $34_2$ of the first core 34 are now orthogonal to the upper major surface 12a of the substrate 12, while the third and fourth sides $34_3$, $34_4$ are parallel to the upper major surface 12a of the substrate 12.

Next a simulation of the operation of the spot size converter 30 will be described, with reference to FIG. 16 and the graph in FIG. 17, which illustrates the results of the simulation.

Figure 17:
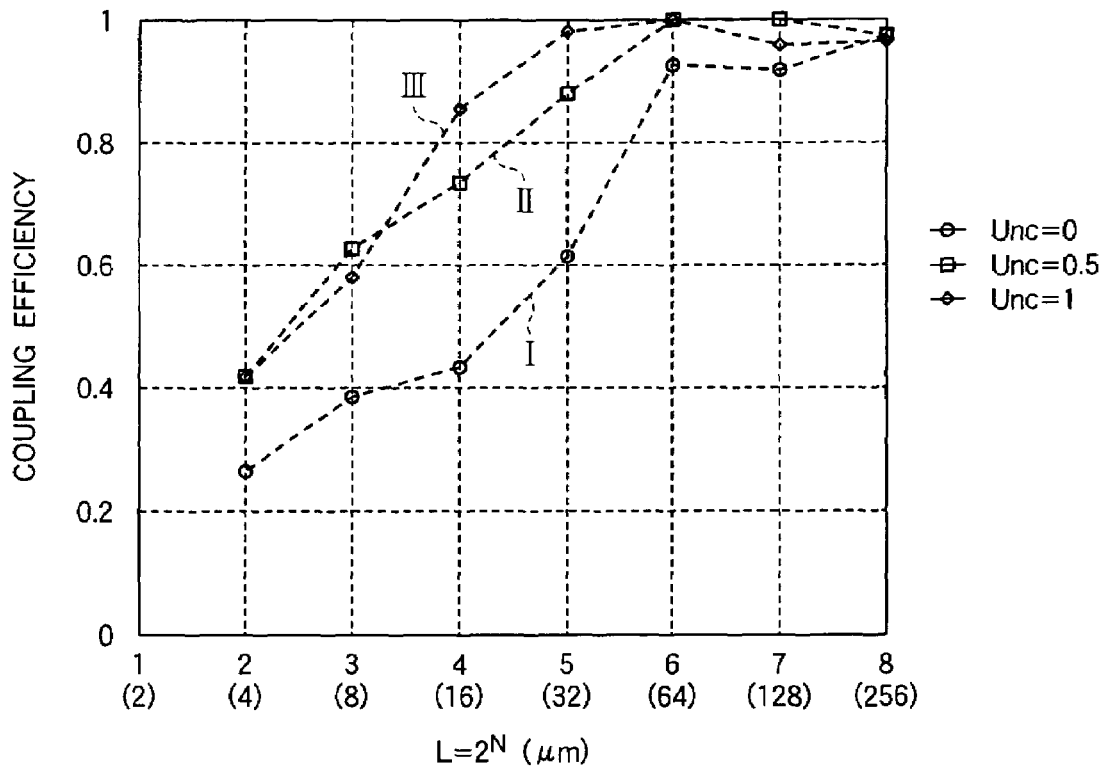
FIG. 17 is a graph illustrating results of a simulation of the operation of the spot size converter in the second embodiment.

In FIG. 17, as in FIG. 6 in the first embodiment, the vertical axis indicates the (non-dimensional) optical coupling efficiency, while the horizontal axis indicates the length L of the optical input-output region 16 in micrometers (the numbers in parentheses) and as a power of two, powers from 1 to 8 indicating lengths from 2 μm ($L=2^1=2$) to 256 μm ($L=2^8=256$).

In the simulation, the coupling efficiency of light was calculated by the semi-vector beam propagation method (SVBPM) as in the first embodiment. A fixed intensity was assigned to the light assumed to enter the spot size converter 30 from an external optical device, the dimension Unc in FIG. 16 was varied as described below, and the intensity of the light in the first core 34 in region B and the coupling efficiency were calculated for each case, as in the first embodiment.

The simulation was performed under conditions similar to those in the first embodiment.

(1) The assumed wavelength of the light was 1.55 μm.

(2) The first core 34 was assumed to have a square cross-section with width and thickness dimensions of 0.3 μm in region B.

(3) The assumed thickness Ovc (FIG. 16) of the clad 14 on the fourth side $34_4$ of the first core 34 was 0.5 μm.

(4) The first core 34 was assumed to be made from monocrystalline silicon with a refractive index n1 of 3.5. The clad 14 was assumed to be made from $SiO_2$ with a refractive index n2 of 1.46. The second core 20 was assumed to be made from polyimide with a refractive index n3 of 1.6.

(5) The assumed dimensions of the second core 20 were 2 μm high (thick) by 2 μm wide.

The three curves I, II, III in FIG. 17 indicate the results of the simulation for three different thicknesses Unc of the clad 14 between the third side $34_3$ of the first core 34 and the upper major surface 12a of the substrate 12: 0 μm (curve I); 0.5 μm (curve II); and 1 μm (curve III).

As in the first embodiment, a general tendency in FIG. 17 is for the coupling efficiency to increase as the thickness Unc approaches 1 μm (curve III), that is, as the first core 34 approaches the center of the second core 20 in the thickness direction, even if the length L of the optical input-output region 16 is comparatively short. The maximum coupling efficiency on curve III (Unc=1 μm) is substantially 100 percent, and is attained when the length L of the optical input-output region 16 is 64 μm. The optimal length L is therefore longer than in the first embodiment, but is still short enough for practical applications.

Next, referring to FIGS. 7 and 8, and FIGS. 17-23, a method of manufacturing the spot size converter 30 will be described.

(1) Preparatory Step (FIGS. 7 and 8)

A preform 22 is prepared as in the first embodiment.

Figure 18:
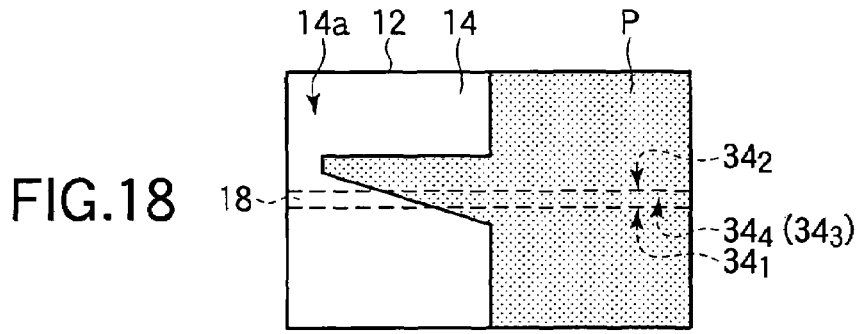
FIG. 18 is a plan view illustrating the first step in a manufacturing process for the spot size converter in the second embodiment.
Figure 19:
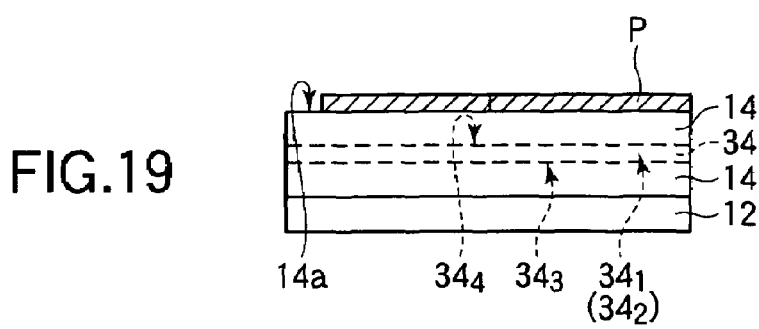
FIG. 19 is a cross-sectional view along line C-C in FIG. 18.

(2) First Step (FIGS. 18 and 19)

An etching mask is formed on the upper surface 14a of the precursor clad 14 of the preform 22. The etching mask has a uniform thickness, and has an edge that diagonally crosses an area covering at least the optical input-output region 16 of the first core 34. To form the etching mask, photoresist is applied with a uniform thickness to the entire upper surface 14a of the precursor clad 14. The photoresist is exposed to light through a mask defining the desired shape of the etching mask, and then developed. After development, the remaining photoresist P becomes the etching mask.

Figure 20:
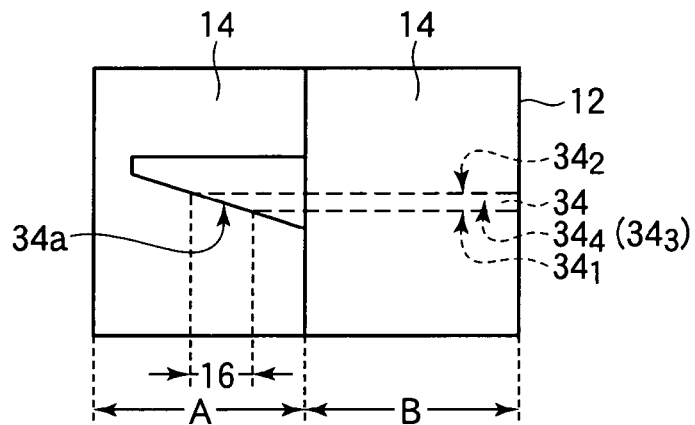
FIG. 20 is a plan view illustrating the second step in the manufacturing process in the second embodiment.
Figure 21:
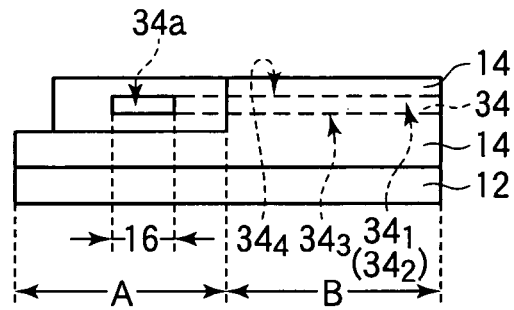
FIG. 21 is a side view illustrating the second step in the manufacturing process in the second embodiment.

(3) Second Step (FIGS. 20 and 21)

The preform 22 is etched by anisotropic RIE to a depth in the precursor clad 14 below the third side $34_3$ of the first core 34, thereby forming the sloping surface 34a of the first core 34 in the optical input-output region 16. The non-etched clad material is left as the clad 14 of the spot size converter 30. The sloping surface 34a is orthogonal to the third and fourth sides $34_3$, $34_4$ and diagonally crosses an area covering at least the optical input-output region 16 of the first core 34.

Figure 22:
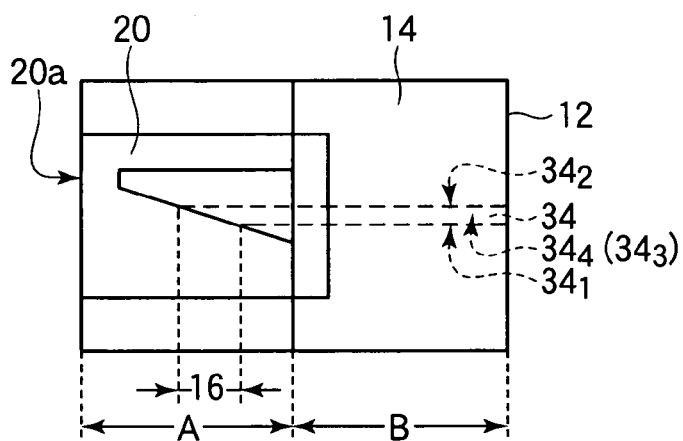
FIG. 22 is a plan view illustrating the third step in the manufacturing process in the second embodiment.
Figure 23:
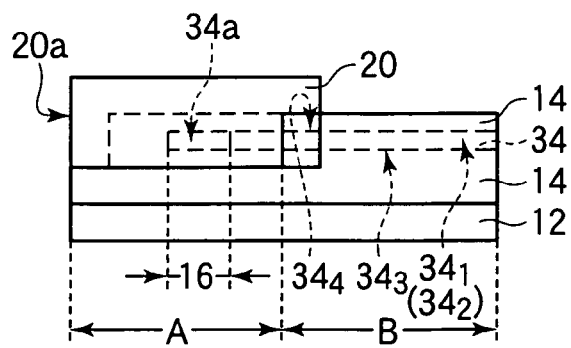
FIG. 23 is a side view illustrating the third step in the manufacturing process in the second embodiment.

(4) Third Step (FIGS. 22 and 23)

The second core 20 is formed and patterned by photolithography to cover the optical input-output region 16 of the first core 34. This step is substantially the same as the third step in the first embodiment.

The effects of the spot size converter 30 and manufacturing method in the second embodiment can be summarized as follows.

(1) Since the front end of the optical input-output region 16 has a thickness that tapers to zero, the spot size converter 30 in the second embodiment has substantially no polarization dependency.

(2) As is clear from the foregoing simulation results, the length L of the optical input-output region 16 can be short enough for practical applications while the coupling efficiency is simultaneously adequate for practical applications.

(3) The spot size converter 30 is extremely easy to manufacture, because all steps in the manufacturing process can be carried out by known semiconductor fabrication methods.

In a variation of the manufacturing process described in the first embodiment, the preform 22 includes only the part of the clad 14 up to the second side $18_2$ of the first core 18. The part of the clad 14 that covers the second side $18_2$ of the first core 18 is formed in one of the processes after the formation of the tapered optical input-output region 16.

Those skilled in the art will recognize that other variations are possible within the scope of the invention, which is defined in the appended claims.

What is claimed is:

1. A spot size converter comprising:
   a clad disposed on a major surface of a substrate;
   a first core extending straight through the clad, the first core having a main core region and an optical input-output region, the main core region having a rectilinear solid shape with four sides and an end, the four sides including a first side, a second side parallel to the first side, a third side orthogonal to the first and second sides, and a fourth side parallel to the third side, the optical input-output region extending from the end of the main core region, the optical input-output region having a sloping surface orthogonal to the third and fourth sides of the main core region, the sloping surface extending from the second side of the main core region to an extension of the first side of the main core region, the first core being surrounded by the clad except for the sloping surface of the optical input-output region, the sloping surface being left exposed by the clad; and a second core disposed on the clad and covering the sloping surface of the optical input-output region of the first core; wherein the first core, the second core, and the clad have respective refractive indexes;

the refractive index of the first core is at least forty percent greater than the refractive index of the clad; and the refractive index of the second core is greater than the refractive index of the clad and less than the refractive index of the first core.

2. The spot size converter of claim 1, wherein said first and second sides are parallel to the major surface of the substrate.

3. The spot size converter of claim 2, wherein the first side of the main core region is disposed between the second side of the main core region and the major surface of the substrate.

4. A method of manufacturing the spot size converter of claim 2, comprising:

preparing a preform including the substrate, a layer of clad material, and a precursor core embedded in the layer of clad material, the layer of clad material having an upper surface and a lower surface, the lower surface being disposed on the major surface of the substrate, the precursor core including the main core region and the optical input-output region of the first core;

forming an etching mask on the upper surface of the layer of clad material, the etching mask having a thickness that varies linearly from a prescribed thickness to zero in a direction parallel to the precursor core in an area covering at least the optical input-output region of the first core;

anisotropically etching the preform and the etching mask by a predetermined amount, the etching mask causing the etching depth to vary linearly from a depth in the layer of clad material lower than the first surface of the first core to a depth higher than the second surface of the first core in said area, thereby forming the sloping surface of the first core in the optical input-output region and leaving a non-etched part of the layer of clad material as the clad of the spot size converter; and forming the second core on the clad so as to cover the sloping surface of the first core.

5. The spot size converter of claim 1, wherein said first and second sides are orthogonal to the major surface of the substrate.

6. A method of manufacturing the spot size converter of claim 5, comprising:

preparing a preform including the substrate, a layer of clad material, and a precursor core embedded in the layer of clad material, the layer of clad material having an upper surface and a lower surface, the lower surface being disposed on the major surface of the substrate, the precursor core including the main core region and the optical input-output region of the first core, the third surface of the first core being disposed between the fourth surface of the first core and the major surface of the substrate;

forming an etching mask on the upper surface of the layer of clad material, the etching mask having an edge that diagonally crosses an area covering at least the optical input-output region of the first core;

anisotropically etching the preform to a depth in the layer of clad material lower than the third surface of the first core, thereby forming the sloping surface of the first core in the optical input-output region and leaving a non-etched part of the layer of clad material as the clad of the spot size converter; and forming the second core on the clad so as to cover the sloping surface of the first.

7. The spot size converter of claim 1, wherein the clad comprises silicon dioxide and the first core comprises silicon.

8. The spot size converter of claim 7, wherein the second core comprises polyimide.

9. The spot size converter of claim 1, wherein the second core has a facet parallel to the end of the main core region of the first core, the optical input-output region of the first core being disposed between said facet and the end of the main core region of the first core, said facet forming an optical interface with an external optical device.

10. The spot size converter of claim 9, wherein an orthogonal projection of the first core onto said facet of the second core is substantially centered within said facet of the second core.

11. The spot size converter of claim 1, wherein the clad has a sloping surface surrounding and coplanar with the sloping surface of the input-output region of the first core.

* * * * *